(12) United States Patent
Nomura et al.

(10) Patent No.: US 12,101,311 B2
(45) Date of Patent: Sep. 24, 2024

(54) INFORMATION PROCESSING DEVICE AND LOGIN PERMISSION METHOD

(71) Applicant: Sony Interactive Entertainment Inc., Tokyo (JP)

(72) Inventors: Masanori Nomura, Tokyo (JP); Takashi Fujita, Tokyo (JP); Shigetaka Kudo, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 314 days.

(21) Appl. No.: 17/596,044

(22) PCT Filed: Jul. 9, 2020

(86) PCT No.: PCT/JP2020/026859
§ 371 (c)(1),
(2) Date: Dec. 2, 2021

(87) PCT Pub. No.: WO2021/010279
PCT Pub. Date: Jan. 21, 2021

(65) Prior Publication Data
US 2022/0321553 A1 Oct. 6, 2022

(30) Foreign Application Priority Data
Jul. 16, 2019 (JP) .................. 2019-131312

(51) Int. Cl.
*H04L 9/40* (2022.01)
(52) U.S. Cl.
CPC ........ *H04L 63/083* (2013.01); *H04L 63/0876* (2013.01)

(58) Field of Classification Search
CPC .................. H04L 63/083; H04L 63/0876
(Continued)

(56) References Cited

U.S. PATENT DOCUMENTS 9,682,323 B2 6/2017 Imai
9,844,722 B2 12/2017 Tsuchiya
(Continued)

FOREIGN PATENT DOCUMENTS

JP 2015165910 A 9/2015
JP 2016046538 A 4/2016
(Continued)

OTHER PUBLICATIONS

Decision to Grant a Patent for a corresponding JP Application No. 2019-131312, 4 pages, dated Jan. 30, 2023.
(Continued)

*Primary Examiner* — Michael S McNally
(74) *Attorney, Agent, or Firm* — Matthew B. Dernier, Esq.

(57) ABSTRACT

In a second information processing device, an account holding section holds account information of a user. A reception section receives a login request including account information of a user from a first information processing device. A login processing section 102*b* allows the user to log in in a case in which the account holding section holds the account information of the user. In a state in which the user is logging in, when the reception section receives a login request including account information of a user from the first information processing device, the login processing section allows the user to log in on a condition that the account holding section holds the account information of the user.

5 Claims, 8 Drawing Sheets

(58) Field of Classification Search
USPC .............................................. 726/7
See application file for complete search history.

(56) References Cited

U.S. PATENT DOCUMENTS

| | | | |
|---|---|---|---|
| 10,166,480 B2 | 1/2019 | Tsuchiya | |
| 10,369,479 B2 | 8/2019 | Suwa | |
| 2012/0084210 A1* | 4/2012 | Farahmand | G06Q 40/02 |
| | | | 705/64 |
| 2012/0315983 A1 | 12/2012 | Miller, IV | |
| 2014/0349753 A1 | 11/2014 | Imai | |
| 2015/0209676 A1 | 7/2015 | Tsuchiya | |
| 2016/0082355 A1* | 3/2016 | Kobayashi | H04L 67/54 |
| | | | 463/29 |
| 2016/0250548 A1* | 9/2016 | Tsuchiya | A63F 13/20 |
| | | | 463/36 |
| 2017/0225082 A1* | 8/2017 | Suwa | G06F 13/00 |

FOREIGN PATENT DOCUMENTS

| | | |
|---|---|---|
| JP | 2016158830 A | 9/2016 |
| WO | 2013111247 A1 | 8/2013 |

OTHER PUBLICATIONS

International Search Report for corresponding PCT Application No. PCT/JP2020/026859, 4 pages, dated Sep. 8, 2020.

\* cited by examiner

4a

INFORMATION PROCESSING DEVICE AND LOGIN PERMISSION METHOD

TECHNICAL FIELD

The present invention relates to a technique that allows a user to log in to an information processing device.

BACKGROUND ART

A user can play a game by logging in to a game device. PTL 1 discloses a technique of connecting a terminal device of a user with a game device which is located at a home of the user via the Internet to log in to the game device from a remote location. In this technique, the terminal device transmits operation information of the user to the game device, and the game device reflects the operation information in a progress of the game to generate image data and sound data and transmits the generated data to the terminal device by streaming. Accordingly, the user can play the game while being at a remote location that is distant from the game device. This play mode is called a "remote play."

CITATION LIST PATENT LITERATURE

[PTL 1] WO 2013/111247

Summary Technical Problem

Even when a user goes to a home of a friend who possesses a game device and tries to play a game together, the friend may not have a fun game supporting a local multiple play, in some cases. Under such a situation described above, in a case in which the game device which is located at a home of the user has a fun game installed therein that supports a local multiple play, it is preferable to achieve an environment in which the user and the friend can play the game together without having to move to the user's home.

In view of this, an object of the present invention is to provide a technique for achieving an environment for a new game play by applying the technique of the remote play.

Solution to Problem

In order to solve the above problem, an information processing device according to an aspect of the present invention is connected with another information processing device through a network and includes an account holding section that holds account information of a user, a reception section that receives a login request including account information of a first user from the other information processing device, and a login processing section that allows the first user to log in in a case in which the account holding section holds the account information of the first user. In a state in which the first user is logging in, when the reception section receives a login request including account information of a second user from the other information processing device, the login processing section allows the second user to log in on a condition that the account holding section holds the account information of the second user.

Another aspect of the present invention relates to a method of allowing a user to log in to an information processing device provided with an account holding section that holds account information of the user. The account holding section holds account information of a first user and does not hold account information of a second user, and the information processing device is connected with another information processing device through a network. This method includes a step of receiving a login request including the account information of the first user from the other information processing device, a step of allowing the first user to log in, a step of receiving a login request including the account information of the second user from the other information processing device in a state in which the first user is logging in, a step of acquiring the account information of the second user and causing the acquired account information to be held in the account holding section, and a step of allowing the second user to log in.

Note that any combinations of the above components and expressions of the present invention as converted into methods, devices, systems, and computer programs are also effective as aspects of the present invention.

DESCRIPTION OF EMBODIMENT

Figure 1:
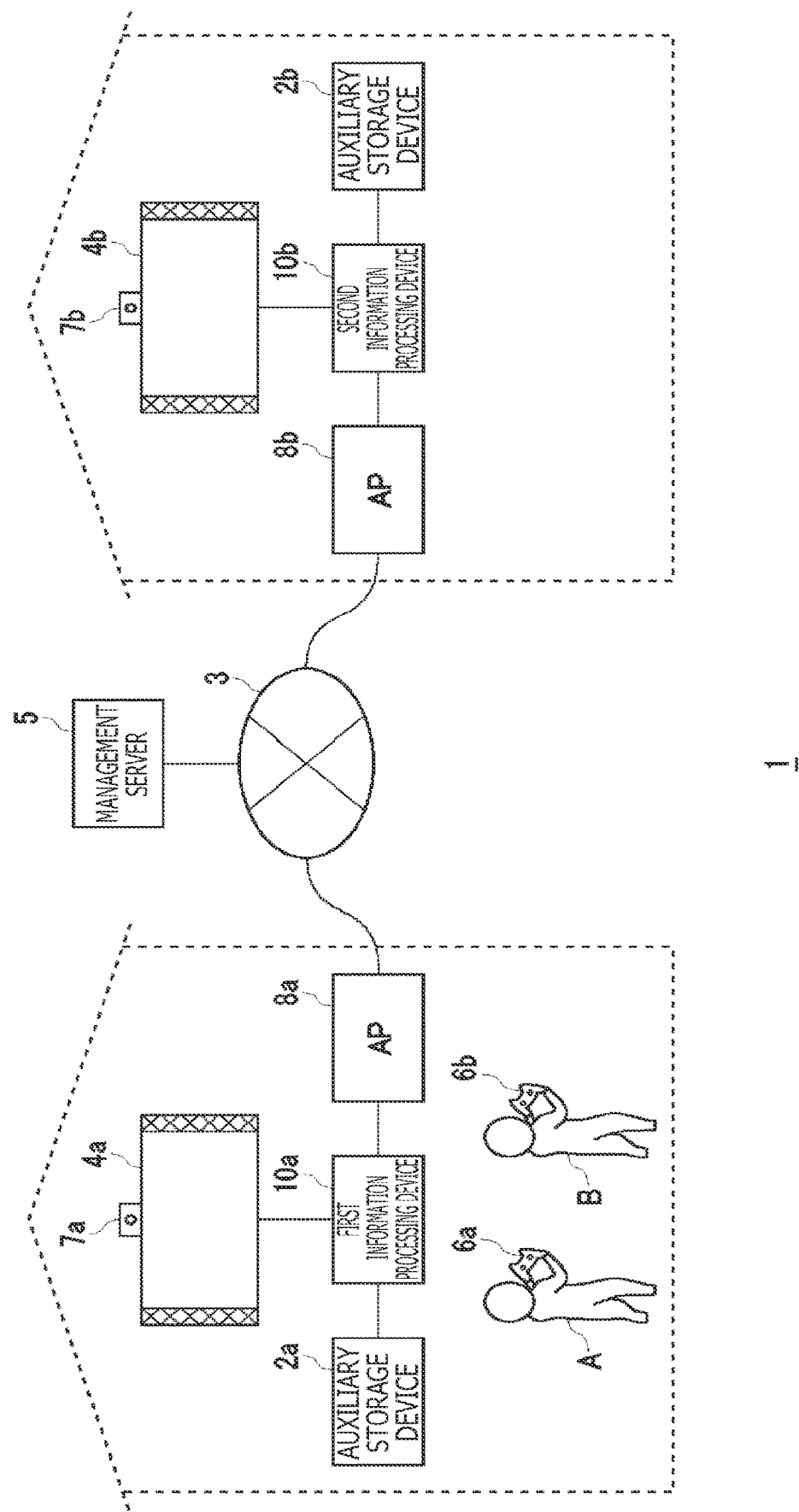
FIG. 1 is a diagram illustrating one mode of an information processing system.

FIG. 1 is a diagram illustrating one mode of an information processing system according to an embodiment. In an information processing system 1, a management server 5 provides a network service regarding a game to a user. The management server 5 manages account information for identifying a user, and the user uses his/her account information to sign in to the network service provided by the management server 5. Note that, in the following description, signing in to a network service may be referred to as signing in to the management server 5, in some cases.

The account information may include a mail address and a password. When the user logs in to an information processing device that holds his/her account information, the account information is authenticated by the management server 5, so that the user can log in to the management server 5. Here, login to the information processing device means that the user is allowed to use functions of the information processing device, and that the user signs in to the management server 5 means that the user is allowed to use the network service. The user can log in to an information processing device that does not hold his/her account information; however, the user cannot sign in to the management server 5 at that time and use the network service.

The user signs in to the management server 5, so that the user can store save data of a game in the management server 5 and can resister a prize (trophy) obtained during a game play into the management server 5. In addition, the user signs in to the management server 5, so that the user can also perform a "remote play" in which the user logs in to a certain information processing device that is at a remote location distant from the terminal device to play a game. In the information processing system 1 illustrated in FIG. 1, during a remote play, the first information processing device 10a serves as a terminal device and establishes P2P communication with a second information processing device 10b that is at a remote location through a network 3. In the embodiment, the first information processing device 10a and the second information processing device 10b have a function of executing an application such as a game.

The first information processing device 10a is placed at a home of a user A. The first information processing device 10a holds account information of the user A, and when the user A operates an input device 6a and logs in to the first information processing device 10a, the account information of the user A is authenticated by the management server 5, so that the user A signs in to the management server 5.

The user B is a friend who has come to the user A's home. The first information processing device 10a holds the account information of the user B. For example, in a case in which the user B often comes to the user A's home, the user A allows account information of the user B to be registered into the first information processing device 10a, so that the user B becomes able to log in to the first information processing device 10a as the user B.

Thus, when the user B operates an input device 6b and logs in to the first information processing device 10a, the account information of the user B is authenticated by the management server 5, so that the user B signs in to the management server 5. Accordingly, the user B can store save data of a game which has been played with the first information processing device 10a in the management server 5, can register a trophy obtained during the game play into the management server 5, and can perform a remote play again.

The first information processing device 10a is connected with the input device 6a operated by the user A and the input device 6b operated by the user B in a wireless or wired manner. In the following description, in a case in which the input devices 6a and 6b are not required to be distinguished with each other, the input device is called an "input device 6." When receiving operation information from the input device 6, the first information processing device 10a reflects the operation information in processing of system software and application software, causing processing results to be output from an output device 4a. In the embodiment, the first information processing device 10a is a game device that executes an application such as a game, and the input device 6 is a game controller that supplies operation information of the user A or B to the first information processing device 10a.

An auxiliary storage device 2a is a large-capacity storage device such as an HDD (Hard Disk Drive) and an SSD (Solid State Drive) and may be a built-in storage device or may be an external storage device that is connected with the first information processing device 10a through a USB (Universal Serial Bus) or the like. The output device 4a may be a television having a display that outputs an image and a speaker that outputs a sound. The output device 4a may be connected with the first information processing device 10a through a cable or may be connected therewith wirelessly.

An access point (hereinafter, referred to as an "AP") 8a has functions of a wireless access point and a router, and the first information processing device 10a is connected with the AP 8a in a wireless or wired manner to be connected with the external network 3 through the AP 8. A camera 7a is a stereo camera and images a space around the output device 4a.

As described above, the second information processing device 10b is placed at a home of the user B. The second information processing device 10b is connected in a wireless or wired manner with an auxiliary storage device 2b, an output device 4b, a camera 7b, and an AP 8b that are pieces of peripheral equipment. Connection between the second information processing device 10b and the peripheral equipment at the home of the user B may be the same as connection between the first information processing device 10a and the peripheral equipment at the home of the user A. In the embodiment, the second information processing device 10b is a game device that executes an application such as a game. In the following, if the first information processing device 10a and the second information processing device 10b are not particularly distinguished from each other, they may simply be called an "information processing device 10," in some cases.

Figure 2:
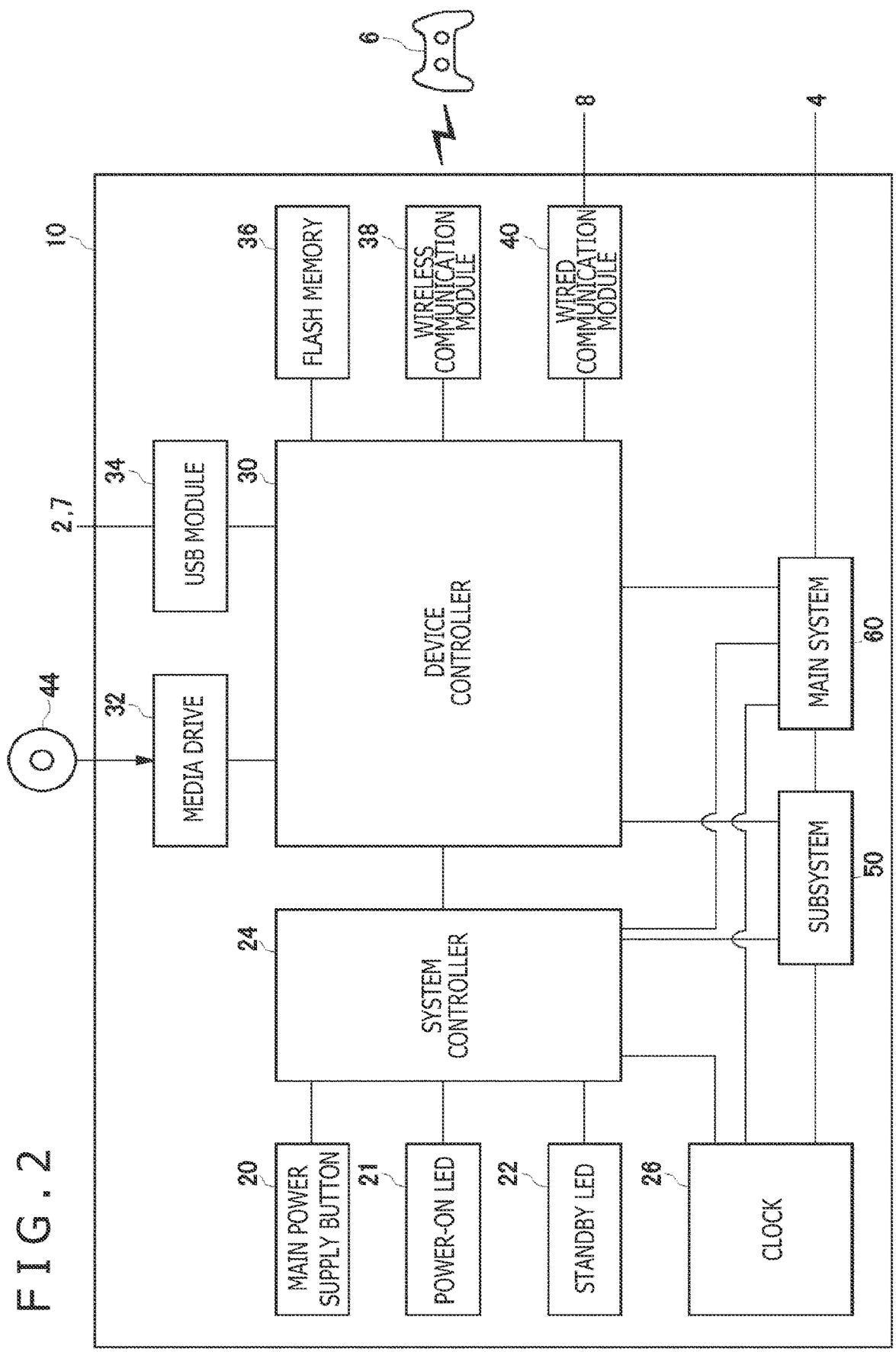
FIG. 2 is a diagram illustrating a hardware configuration of an information processing device.

FIG. 2 illustrates a hardware configuration of the information processing device 10. The information processing device 10 includes a main power supply button 20, a power-ON LED (Light Emitting Diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory serving as a main storage device, a memory controller, a GPU (Graphics Processing Unit), and the like. The GPU is used mainly for computing processing of a game program. These functions may be configured as a system-on-chip and formed on one chip. The main CPU has a function of executing a game program recorded in the auxiliary storage device 2 or a ROM (Read Only Memory) medium 44.

The subsystem 50 includes a sub CPU, a memory serving as a main storage device, a memory controller, and the like, but neither includes a GPU nor has a function of executing a game program. The number of circuit gates of the sub CPU is smaller than the number of circuit gates of the main CPU, and the operation power consumption of the sub CPU is lower than the operation power consumption of the main CPU.

The main power supply button 20 is an input unit through which operation input is performed by a user, and is provided on a front face of the casing of the information processing device 10. The main power supply button 20 is operated in order to turn on or off power supply to the main system 60 of the information processing device 10. The power-ON LED 21 is lit when the main power supply button 20 is turned on, and the standby LED 22 is lit when the main power supply button 20 is turned off.

The system controller 24 detects depression of the main power supply button 20 performed by a user. If the main power supply button 20 is depressed when the main power supply is in an off-state, the system controller 24 accepts the depression operation as a "turn on instruction," but if the main power supply button 20 is depressed when the main power supply is in an on-state, the system controller 24 accepts the depression operation as a "turn off instruction."

The clock 26 is a real time clock, generates current date and time information, and supplies the generated information to the system controller 24, the subsystem 50, and the main system 60. The device controller 30 is configured as an LSI (Large-Scale Integrated Circuit) which executes delivery of information between devices like a south bridge. As depicted in the figure, such devices as the system controller 24, the media drive 32, the USB module 34, the flash memory 36, the wireless communication module 38, the wired communication module 40, the subsystem 50, and the main system 60 are connected to the device controller 30. The device controller 30 accommodates a difference in electric characteristic or a difference in data transfer rate between the devices and controls the timing of data transfer.

The media drive 32 is a drive device which is loaded with and drives the ROM medium 44 on which application software such as a game and license information are recorded, and reads a program, data, and the like from the ROM medium 44. The ROM medium 44 may be a read-only recording medium such as an optical disc, a magneto-optical disc, or a Blu-ray disc.

The USB module 34 is a module connected to external equipment by a USB cable. The USB module 34 may be connected to the auxiliary storage device 2 and the camera 7 by a USB cable. The flash memory 36 is an auxiliary storage device forming an internal storage. The wireless communication module 38 performs wireless communication, for example, with the input device 6 under a communication protocol such as a Bluetooth (registered trademark) protocol or an IEEE (Institute of Electrical and Electronics Engineers) 802.11 protocol. The wired communication module 40 performs wired communication with external equipment and is connected to the network 3 through the AP 8.

In the embodiment, the users A and B gather at the user A's home, and each of the users A and B logs in to the first information processing device 10a to sign in to the management server 5. In this state, the user B executes an application for achieving a remote play (hereinafter, referred to as a "remote application") and logs in to the second information processing device 10b from the first information processing device 10a. When the second information processing device 10b receives a login request of the user A from the first information processing device 10a in a state in which the user B logs in to the second information processing device 10b, the user A logs in to the second information processing device 10b on a condition that the second information processing device 10b holds the account information of the user A. Hence, not only the user B, but also the user A logs in to the second information processing device 10b remotely, and the users A and B can play a game supporting a local multi play with the second information processing device 10b, for example. In the following, the scheme thereof will be described.

Figure 3:
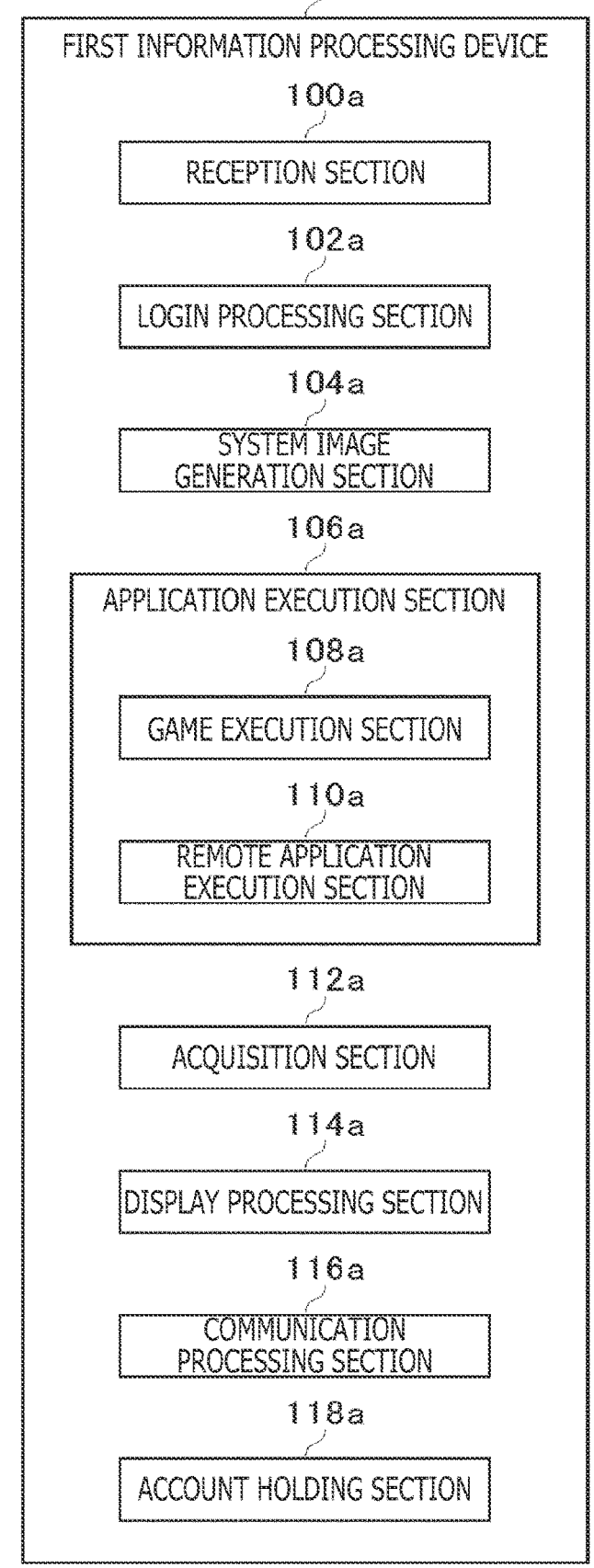
FIG. 3 is a diagram illustrating functional blocks of a first information processing device.

FIG. 3 illustrates functional blocks of the first information processing device 10a. The first information processing device 10a includes a reception section 100a, a login processing section 102a, a system image generation section 104a, an application execution section 106a, an acquisition section 112a, a display processing section 114a, a communication processing section 116a, and an account holding section 118a. The application execution section 106a has a function of executing a plurality of applications simultaneously and in the embodiment, has a game execution section 108a that executes a game and a remote application execution section 110a that executes a remote application. The communication processing section 116a represents a function of the wireless communication module 38 and the wired communication module 40 that are illustrated in FIG. 2.

In FIG. 3, elements indicated as functional blocks for performing various types of processing can be configured by hardware such as a circuit block, a memory, or another LSI or implemented by software such as a program that is loaded into the memory. Thus, it will be understood by those skilled in the art that these functional blocks can be variously implemented by hardware only, by software only, or by a combination of hardware and software. The functional blocks are not limited to any of these.

In the first information processing device 10a, the account holding section 118a holds at least the account information of the user A and the account information of the user B. When the first information processing device 10a is activated, the login processing section 102a generates a login screen to be displayed on the output device 4a. On the login screen, user information regarding a user who has registered his/her account information in the first information processing device 10a is displayed in a list. When the user who desires to log in selects his/her own user information, the reception section 100a receives the selection operation of the user information, and the login processing section 102a allows the user to log in. For example, if a pass cord for login has been set in advance, the login processing section 102a allows the user to log in after authentication of the pass cord is completed.

In the embodiment, the user A operates the input device 6a on the login screen and logs in to the first information processing device 10a, while the user B operates the input device 6b on the login screen and logs in to the first information processing device 10a. When the users A and B each log in to the first information processing device 10a, the account information is authenticated by the management server 5, and the users A and B sign in to the management server 5. Note that, although the embodiment is set forth on the assumption that the account information of the user B has been held in the account holding section 118a in advance, in a case in which the account information of the user B has not been held therein, the user B first registers the account information into the account holding section 118a, then logs in to the first information processing device 10a, and accordingly, signs in to the management server 5.

After the users A and B log in, when the user A selects a game supporting a local multi play from the home screen, the game execution section 108a activates the selected game, and the display processing section 114a displays a game screen on the output device 4a. Accordingly, the users A and B can play the game together.

However, the users A and B often play this game only and may have been tired of the game. In this case, if the user B purchases a new game supporting a local multi play and installs the game in the second information processing device 10b that is placed at the home of the user B, the users A and B may think about playing the game together. In view of this, in the information processing system 1, an environment in which the users A and B can play the game installed in the second information processing device 10b together without moving to the home of the user B is achieved.

Figure 4:
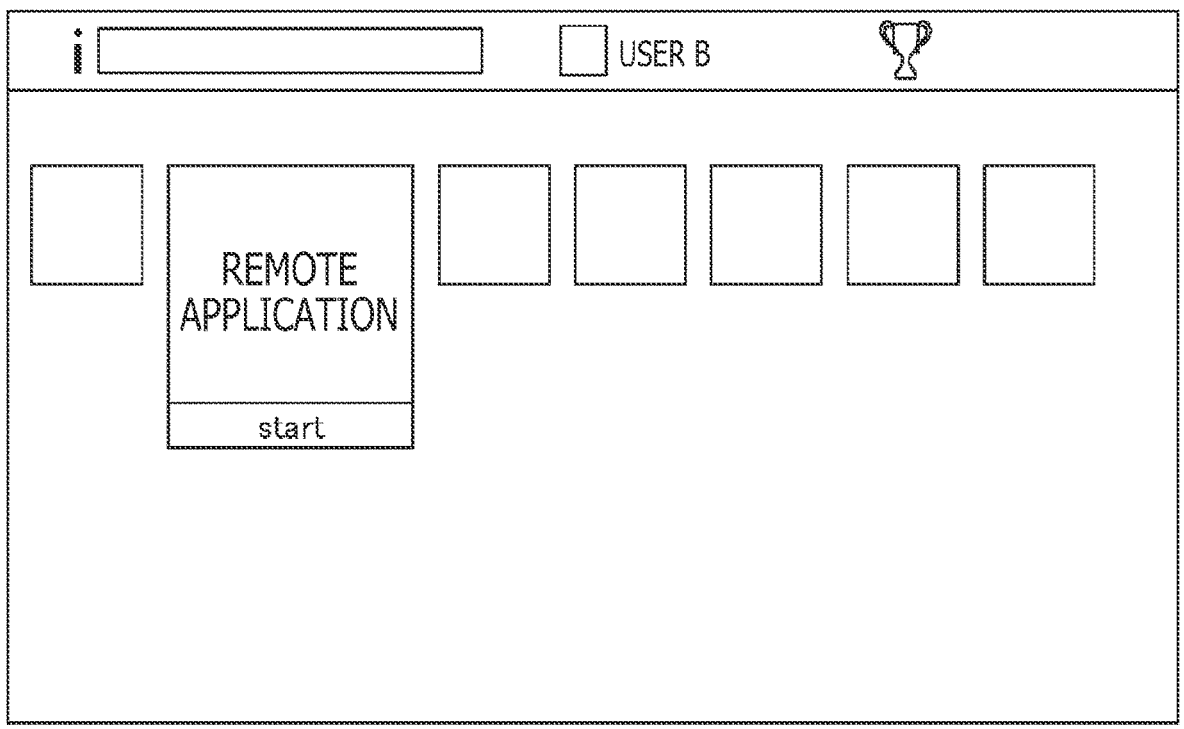
FIG. 4 is a diagram illustrating an example of a home screen of a user B in the first information processing device.

FIG. 4 illustrates an example of a home screen of the user B in the first information processing device 10a. When the user B logs in to the first information processing device 10a, or when the user B operates a predetermined button of the input device 6b, the system image generation section 104a generates the home screen for the user B. The user B selects an icon of a remote application on the home scree and activates the remote application. The remote application execution section 110a executes a remote application and provides a setting screen for performing a remote play by the user B.

When the user B inputs, in the remote play setting screen, information for identifying the second information processing device 10b that is a connection destination, the communication processing section 116a transmits a connection request to the second information processing device 10b. At this time, if the main power supply of the second information processing device 10b is in an off-state, the main system 60 of the second information processing device 10b is activated according to the connection request. The first information processing device 10a and the second information processing device 10b are connected with each other through the network 3 in P2P communication, forming an environment in which a remote play can be performed. When the first information processing device 10a and the second information processing device 10b are connected with each other in P2P communication, a remote application causes the communication processing section 116a to transmit a login request including the account information of the user B to the second information processing device 10b.

Figure 5:
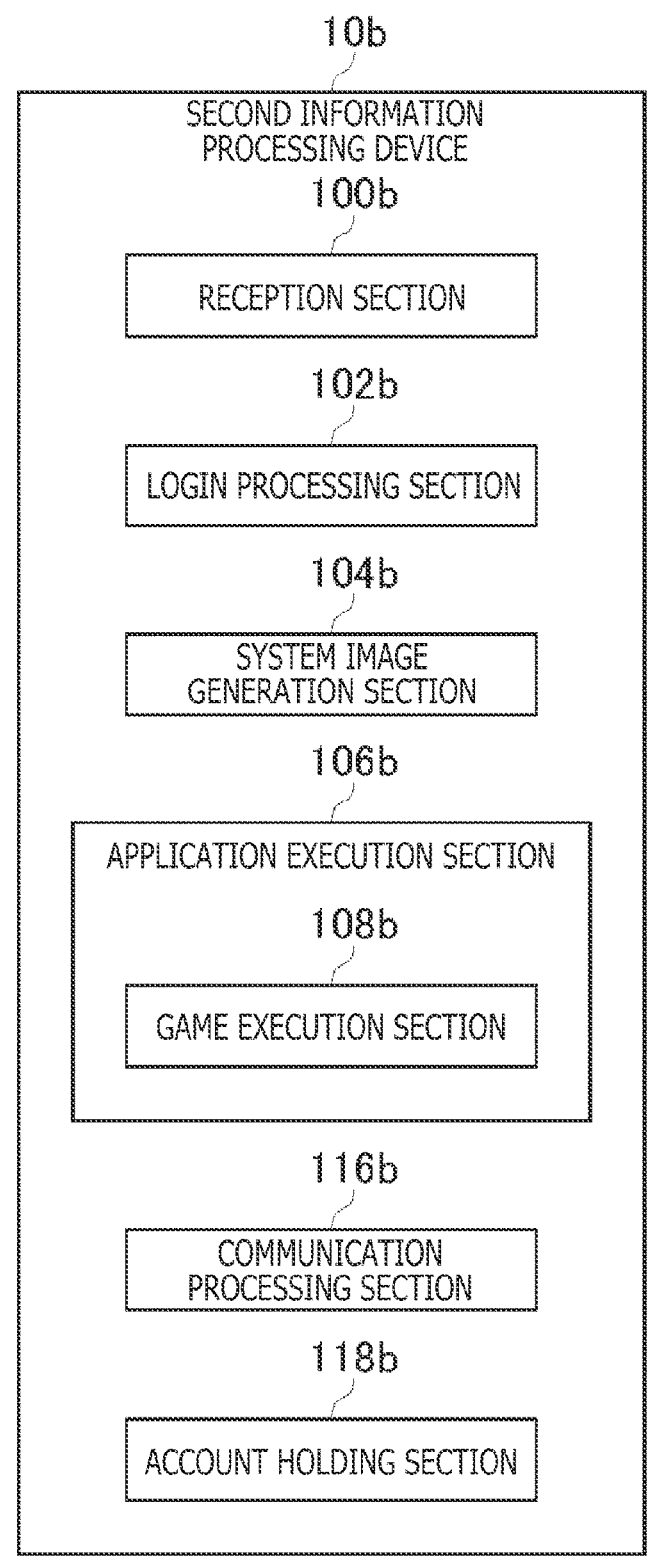
FIG. 5 is a diagram illustrating functional blocks of a second information processing device.

FIG. 5 illustrates functional blocks of the second information processing device 10b. The second information processing device 10b includes a reception section 100b, a login processing section 102b, a system image generation section 104b, an application execution section 106b, a communication processing section 116b, and an account holding section 118b. The application execution section 106b has a function of executing a plurality of applications simultaneously and has a game execution section 108b that executes a game. The communication processing section 116b represents a function of the wireless communication module 38 and the wired communication module 40 that are illustrated in FIG. 2.

In FIG. 5, elements indicated as functional blocks for performing various types of processing can be configured by hardware such as a circuit block, a memory, or another LSI or implemented by software such as a program that is loaded into the memory. Thus, it will be understood by those skilled in the art that these functional blocks can be variously implemented by hardware only, by software only, or by a combination of hardware and software. The functional blocks are not limited to any of these. Note that the second information processing device 10b may be a game device including the same function as the first information processing device 10a. In the second information processing device 10b, the account holding section 118b holds the account information of the user B. The account holding section 118b does not hold the account information of the user A.

The communication processing section 116b receives a login request including the account information of the user B from the first information processing device 10a. The reception section 100b accepts the login request that has been received in the communication processing section 116b, and transfers the login request to the login processing section 102b. In a case in which the account holding section 118b holds the account information of the user B, the login processing section 102b allows the user B to log in. In this case, since the second information processing device 10b is a game device of the user B and the account holding section 118b holds the account information of the user B, the login processing section 102b allows the user B to log in.

Figure 6:
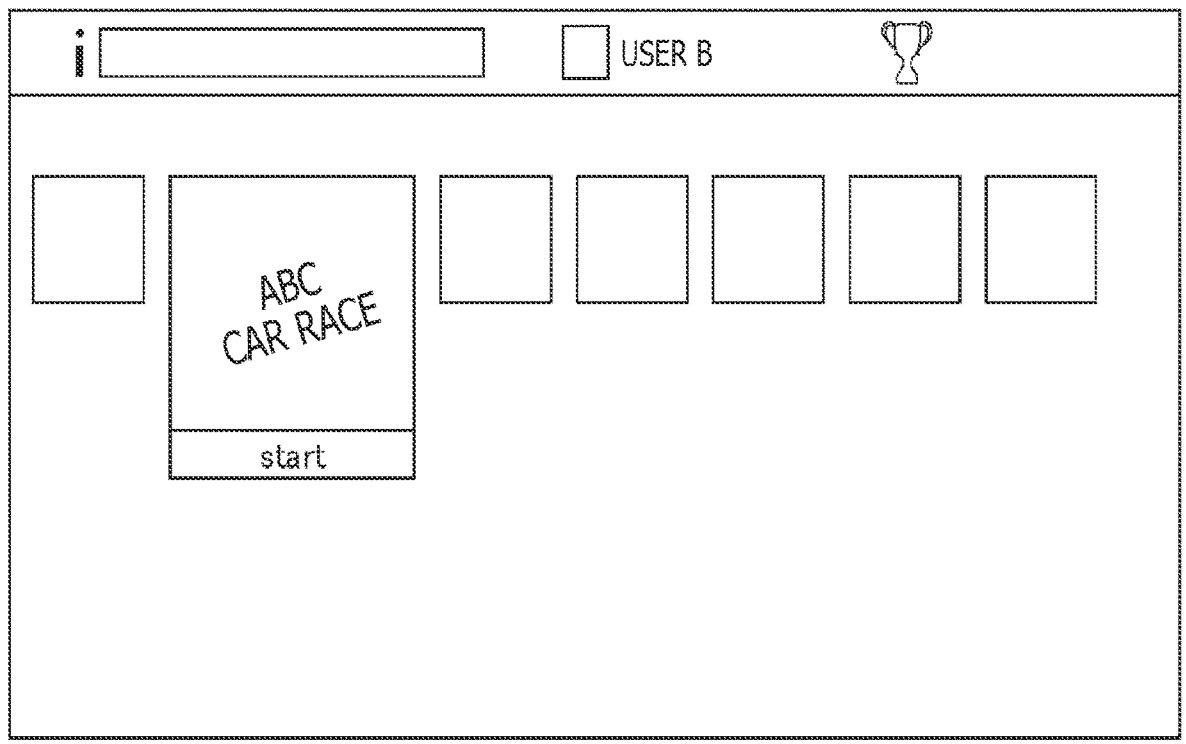
FIG. 6 is a diagram illustrating an example of a home screen of the user B in the second information processing device.

FIG. 6 illustrates an example of a home screen of the user B in the second information processing device 10b. When the user B remotely log in to the second information processing device 10b from the first information processing device 10a, the system image generation section 104b generates image data of the home screen for the user B, and the communication processing section 116b transmits the image data to the first information processing device 10a by streaming. In the first information processing device 10a, the communication processing section 116a receives the image data, and the display processing section 114a displays the home screen on the output device 4a. On the home screen, the game icons that have been installed in the auxiliary storage device 2b are arranged.

Figure 7:
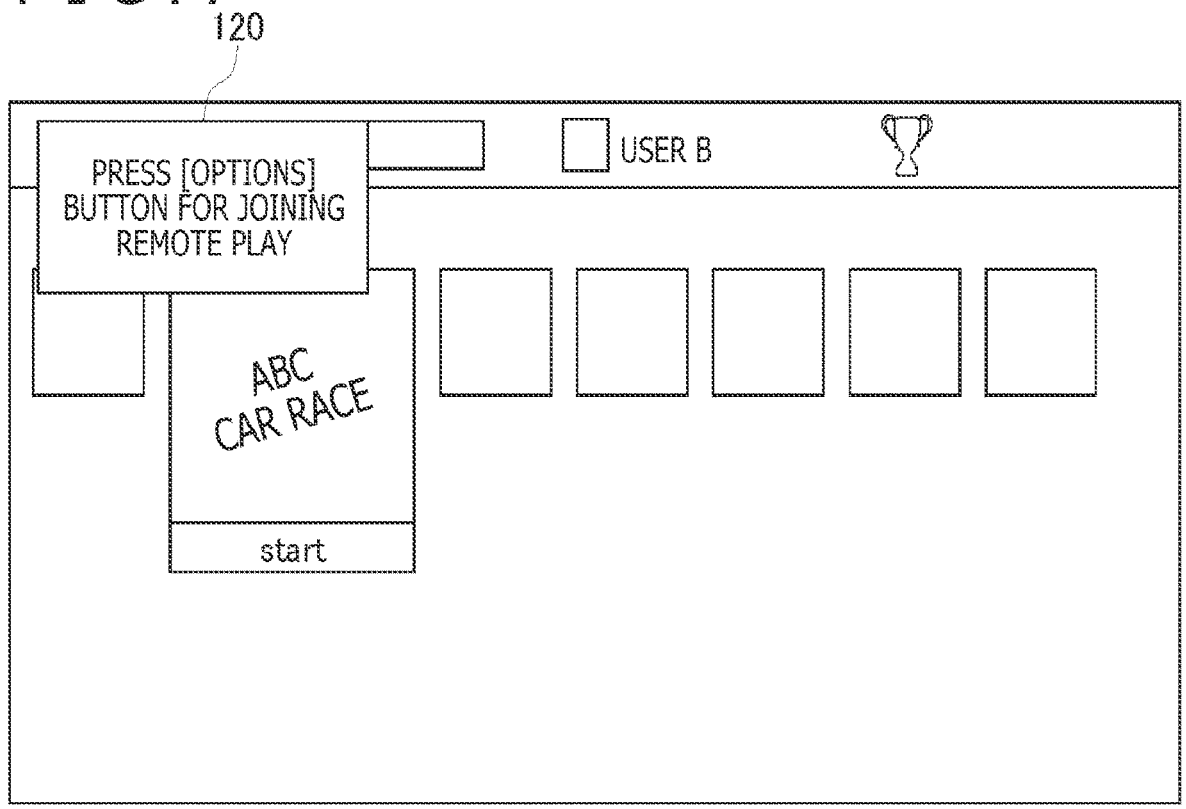
FIG. 7 is a diagram illustrating an example of a message window.

FIG. 7 illustrates an example of a message window displayed on the home screen. A message window 120 may be displayed at a timing at which the user B remotely logs in to the second information processing device 10b and the home screen is then displayed on the output device 4a and at a timing at which the user A operates a predetermined button of the input device 6a. On the message window 120, indicated is a method by which a user other than the user B who has already logged in to the second information processing device 10b logs in to the second information processing device 10b to join a remote play. On this message window 120, indicated is a message that the user can remotely log in to the second information processing device 10b by pressing an [OPTIONS] button that is one of a plurality of buttons that are mounted on the input device 6.

Figure 8:
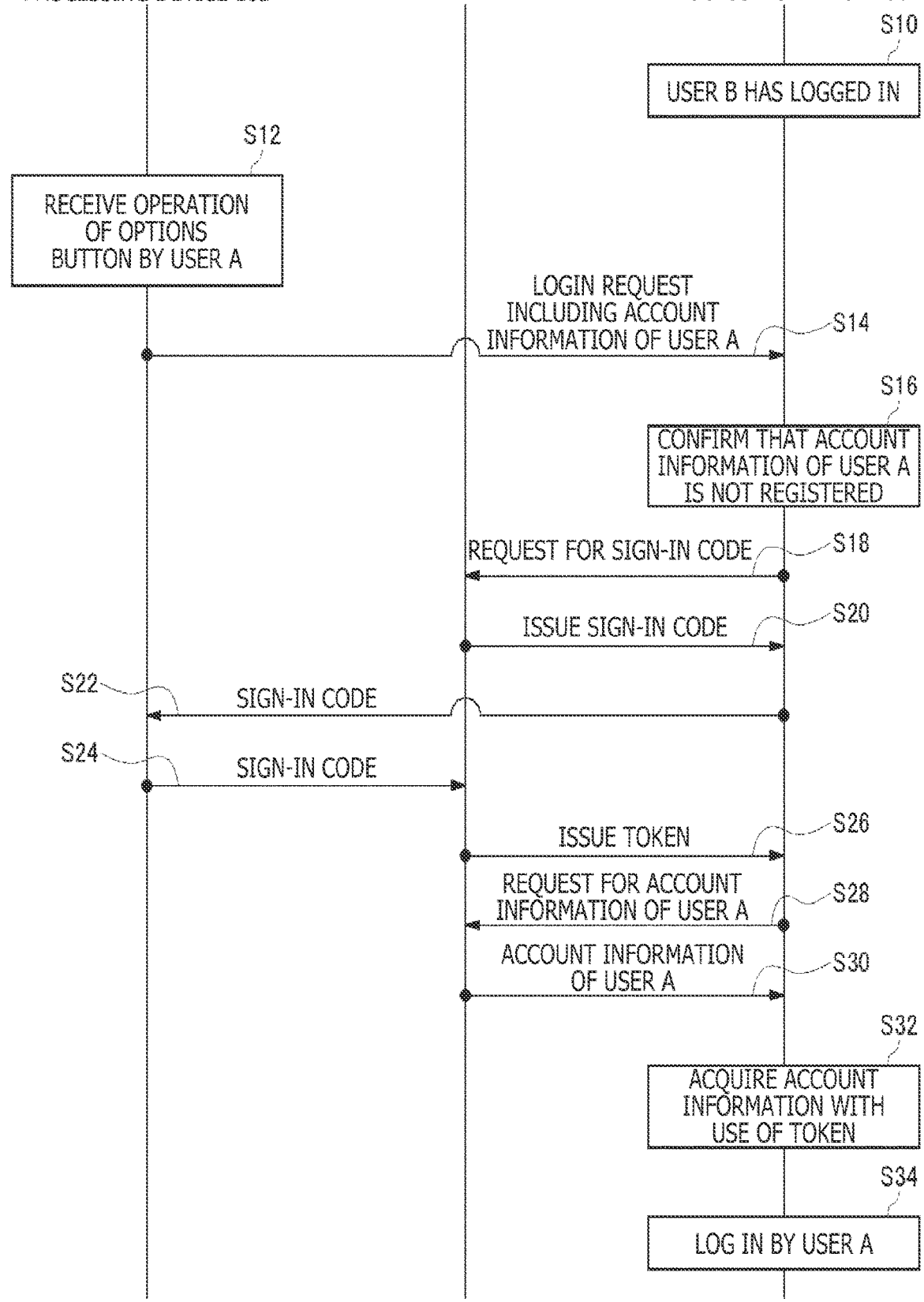
FIG. 8 is a diagram illustrating an example of a procedure for remote login.

FIG. 8 illustrates a procedure for remote login to the second information processing device 10b by the user A. In order for the user A to remotely log in to the second information processing device 10b, it is required, as a condition, that the user B who is an owner of the second information processing device 10b has logged in to the second information processing device 10b by using the remote application first (S10).

When the user A presses the [OPTIONS] button of the input device 6a, the reception section 100a receives operation information of the [OPTIONS] button (S12) and transfers the received operation information to the remote application. The remote application causes the communication processing section 116a to transmit a login request including the account information of the user A to the second information processing device 10b (S14).

In the second information processing device 10b, in a state in which the user B has logged in, the reception section 100b receives the login request including the account information of the user A from the first information processing device 10a and transfers the login request to the login processing section 102b. The login processing section 102b allows the user A to log in on a condition that the account holding section 118b holds the account information of the user A. In this case, since the account holding section 118b does not hold the account information of the user A, the login processing section 102b confirms that the account information of the user A is not registered (S16), and does not allow the user A to log in.

At this time, the login processing section 102b executes a procedure for automatically acquiring the account information of the user A from the management server 5 in order to allow the user A to log in. First, the login processing section 102b requests an authentication code (sign-in code) for the user A's signing in to the management server 5 from the second information processing device 10b (S18), and the management server 5 issues a sign-in code that is randomly generated (S20). The login processing section 102b transfers the sign-in code to the first information processing device 10a (S22), and the remote application of the first information processing device 10a transmits the received sign-in code to the management server 5 (S24). When the management server 5 confirms that the issued sign-in code matches with the sign-in code that has been transmitted from the first information processing device 10a, the management server 5 determines that the user A who is logging in to the first information processing device 10a is a legitimate user.

Thus, the management server 5 issues a token to the second information processing device 10b (S26), the login processing section 102b requests the account information of the user A to the management server 5 (S28), and the management server 5 transmits the account information of the user A which is encrypted (S30). The login processing section 102b acquires the account information of the user A using the token (S32), causing the account holding section 118b to hold the account information of the user A. Hence, the account information of the user A is stored in the account holding section 118b, and the login processing section 102b causes the user A to log in to the second information processing device 10b (S34).

Figure 9:
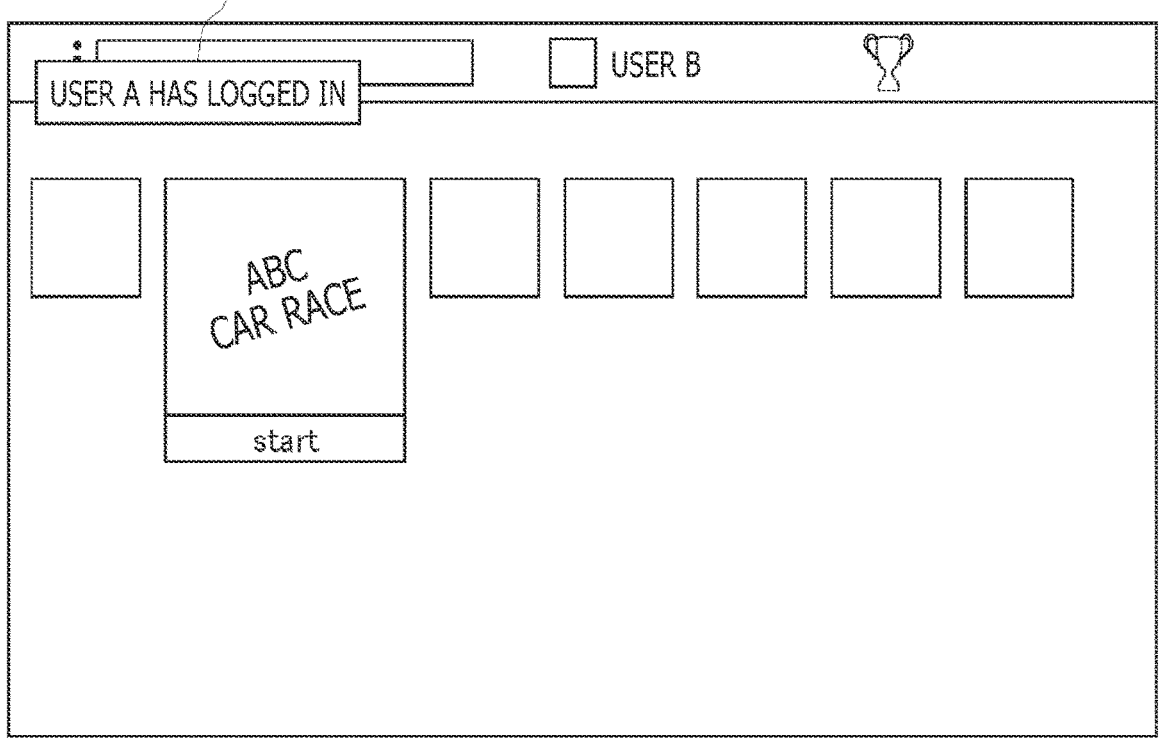
FIG. 9 is a diagram illustrating an example of a message window.

FIG. 9 illustrates an example of a message window displayed on the home screen. A message window 122 is displayed at a timing at which the user A logs in to the second information processing device 10b. The message window 122 displays a message that the user A has logged in to the second information processing device 10b thereon. Since the login processing with use of the sign-in code is performed automatically, it is preferred that, when the user A is caused to log in, the login processing section 102b notify the user A of the effect that the user A has logged in, by use of the message window 122.

In this manner, the login processing section 102b allows the user A to log in, on a condition that the account information of the user A who has transmitted the remote login request is held in the account holding section 118b. Accordingly, in a case in which the account information of the user A is not held in the account holding section 118b, the login processing section 102b acquires the account information of the user A from the management server 5, causes the account holding section 118b to hold the account information, then allows the user A to log in.

Accordingly, when logging in to the second information processing device 10b, the user A can sign in to the network service that is provided by the management server 5, using his/her account information at that same time. Hence, the user A can store save data of a game to be played in the second information processing device 10b in the management server 5 and can register a prize (trophy) that has been obtained during a game play to the management server 5.

On the home screen of the user B, when the user B selects a game icon "ABC CAR RACE" supporting a local multi play, the reception section 100a receives information regarding the selection of the "ABC CAR RACE," and the remote application transmits the information regarding the selection to the second information processing device 10b from the communication processing section 116a. In the second information processing device 10b, the reception section 100b receives the information regarding the selection of the "ABC CAR RACE," and the game execution section 108b activates the "ABC CAR RACE." Accordingly, the users A and B can play the "ABC CAR RACE" together.

Figure 10:
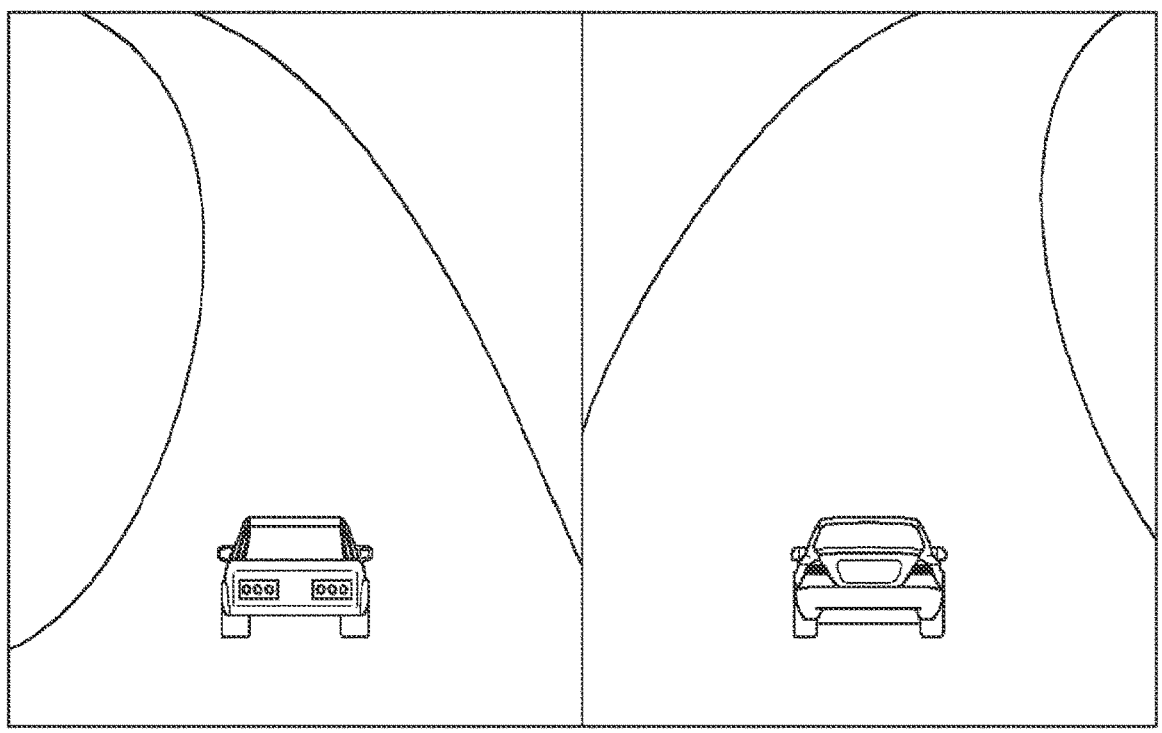
FIG. 10 is a diagram illustrating a game screen.

FIG. 10 illustrates a game screen of the "ABC CAR RACE." In the remote play, the reception section 100a receives operation information that has been input to the input device 6a by the user A and operation information that has been input to the input device 6b by the user B, and the communication processing section 116a transmits the operation information of each of the users A and B to the second information processing device 10b. In the second information processing device 10b, the ABC tennis game deals with the transmitted pieces of operation information of the respective users as input to the game and generates game image data and game sound data in which the operations of the user A and the user B are reflected, and the communication processing section 116b transmits the game image data and the game sound data to the first information processing device 10a by streaming. In the first information processing device 10a, the acquisition section 112a acquires the game image data and the game sound data, the display processing section 114a displays a game screen from the output device 4a, and the sound processing section (not illustrated) outputs a game sound from the output device 4a.

P2P connection between the first information processing device 10a and the second information processing device 10b is disconnected by terminating the remote application. After the disconnection of the P2P connection, the login processing section 102b may delete the account information of the user A that is held in the account holding section 118b. In this manner, it is preferable that the login processing section 102b delete the account information of the user A that has been tentatively registered for a remote play, after the disconnection of the P2P connection. Note that, since the P2P connection may temporarily be disconnected due to a communication failure or the like, the login processing section 102b may delete the account information of the user A from the account holding section 118b after a predetermined period of time (one hour, for example) has elapsed from the disconnection of the P2P connection.

The present invention has been described above on the basis of the embodiment thereof. The foregoing embodiment is illustrative, and it is to be understood by those skilled in the art that combinations of components and processing processes of the embodiment are susceptible of various modifications and that such modifications also fall within the scope of the present invention. In the embodiment, the users A and B log in to the second information processing device 10b to play a game supporting a local multi play, but an object for login is not limited thereto. In addition, in the embodiment, two users remotely log in to second information processing device 10b, but three or more users may log in to the second information processing device 10b.

INDUSTRIAL APPLICABILITY

The present invention is applicable to a technical field in which a user is allowed to log in to an information processing device.

REFERENCE SIGNS LIST

1: Information processing system
2a, 2b: Auxiliary storage device
3: Network
4a, 4b: Output device
5: Management server
6a, 6b: Input device
10a: First information processing device
10b: Second information processing device
100a, 100b: Reception section
102a, 102b: Login processing section
104a, 104b: System image generation section
106a, 106b: Application execution section
108a, 108b: Game execution section
110a: Remote application execution section
112a: Acquisition section
114a: Display processing section
116a, 116b: Communication processing section
118a, 118b: Account holding section
120, 122: Message window

The invention claimed is:

1. An information processing device on which a game application is installed and executable, the information processing device being connected through a network with another information processing device on which the game application is executable when installed, the information processing device comprising:
- an account holding section that holds account information of a user;
- a reception section that receives through the network a login request including account information of a first user from the other information processing device; and
- a login processing section that allows the first user to log in in a case in which the account holding section holds the account information of the first user,
- wherein, in a state in which the first user is logging in, when the reception section receives through the network a login request including account information of a second user from the other information processing device, the login processing section allows the second user to log in on a condition that the account holding section holds the account information of the second user,
- wherein when the users are logged in to the information processing device, the users are able to play, through the network using the other information processing device, the game installed in the information processing device.

2. The information processing device according to claim 1, wherein, in a case in which the account holding section does not hold the account information of the second user, the login processing section acquires the account information of the second user from a server device and then causes the acquired account information to be held in the account holding section.

3. The information processing device according to claim 2, wherein, after connection between the information processing device and the other information processing device is disconnected, the login processing section deletes the account information of the second user that is held in the account holding section.

4. A method of allowing a first user to log in to an information processing device on which a game application is installed and executable, the information processing device provided with an account holding section that holds account information of the first user and not holding account information of a second user, the information processing device being connected through a network with another information processing device on which the game application is executable when installed, the method comprising:
- receiving through the network a login request including the account information of the first user from the other information processing device;
- allowing the first user to log in;
- in a state in which the first user is logging in, receiving through the network a login request including the account information of the second user from the other information processing device;
- acquiring the account information of the second user and causing the acquired account information to be held in the account holding section; and
- allowing the second user to log in,
- wherein when the users are logged in to the information processing device, the users are able to play, through the network using the other information processing device, the game installed in the information processing device.

5. A non-transitory, computer readable storage medium containing a program, which when executed by a computer that is connected with an information processing device on which a game application is installed and executable, the information processing device being connected through a network with another information processing device on which the game application is executable when installed, the computer being connected with an account holding section holding account information of a first user and not holding account information of a second user, causes the computer to perform a method of allowing the first user to log in to the information processing device by carrying out actions, comprising:
- receiving through the network a login request including the account information of the first user from the information processing device;
- allowing the first user to log in;
- in a state in which the first user is logging in, receiving through the network a login request including the account information of the second user from the information processing device;
- acquiring the account information of the second user and causing the acquired account information to be held in the account holding section; and
- allowing the second user to log in,
- wherein when the users are logged in to the information processing device, the users are able to play, through the network using the other information processing device, the game installed in the information processing device.

* * * * *